(12) United States Patent
Yamane et al.

(10) Patent No.: US 8,767,362 B2
(45) Date of Patent: Jul. 1, 2014

(54) ISLANDED POWER SYSTEM WITH DISTRIBUTED POWER SUPPLY

(75) Inventors: Toshihiro Yamane, Kawasaki (JP); Shigeo Numata, Tokyo (JP); Kimio Morino, Tokyo (JP); Eisuke Shimoda, Sakura (JP)

(73) Assignee: Shimizu Corporation, Tokyo (JP)

( * ) Notice: Subject to any disclaimer, the term of this patent is extended or adjusted under 35 U.S.C. 154(b) by 412 days.

(21) Appl. No.: 13/062,529

(22) PCT Filed: Aug. 7, 2009

(86) PCT No.: PCT/JP2009/003806
§ 371 (c)(1),
(2), (4) Date: Mar. 7, 2011

(87) PCT Pub. No.: WO2011/016092
PCT Pub. Date: Feb. 10, 2011

(65) Prior Publication Data
US 2011/0170219 A1    Jul. 14, 2011

(51) Int. Cl.
*H02H 3/00*    (2006.01)

(52) U.S. Cl.
USPC .......................................................... 361/62

(58) Field of Classification Search
USPC ......... 307/64, 66, 68, 125, 216; 700/286–298
See application file for complete search history.

(56) References Cited

U.S. PATENT DOCUMENTS

| 6,055,144 A * | 4/2000 | Reid ................................ 361/64 |
| 2008/0088183 A1 * | 4/2008 | Eckroad et al. .................. 307/66 |

FOREIGN PATENT DOCUMENTS

| CN | 1756025 A | 4/2006 | |
| JP | H4-10302 | 5/1987 | |
| JP | H4-10302 | 2/1992 | |
| JP | 06-245410 | 9/1994 | |
| JP | 2002-070606 | 3/2002 | |
| JP | 2002-135982 | 5/2002 | |
| JP | 2002-171671 | 6/2002 | |
| JP | 2004147445 A * | 5/2004 | ................ H02J 3/32 |
| JP | 2005-245190 | 9/2005 | |
| JP | 2006-183551 | 7/2006 | |
| JP | 2009027861 A * | 2/2009 | |

OTHER PUBLICATIONS

Akira Nakama, Office Action for corresponding Japanese Application No. 2008-058336, pp. 1-8 (Nov. 8, 2011).
Akira Nakama, Office Action for corresponding Japanese Application No. 2008-058336, pp. 1-8 (Nov. 4, 2011).
Office Action, Application No. CN 200980160792.6, mailed Nov. 4, 2013.

* cited by examiner

*Primary Examiner* — Jared Fureman
*Assistant Examiner* — Daniel Kessie
(74) *Attorney, Agent, or Firm* — Hoffmann & Baron, LLP

(57) ABSTRACT

An islanded power system with a distributed power supply includes a system abnormality detection unit, which outputs an abnormality detection signal when an abnormality in a commercial system is detected; a breaker, which interrupts a supply of power from the commercial system when the abnormality detection signal is input from the system abnormality detection unit; a status detection unit, which outputs a breaker status signal when the breaker's open state is detected; and an electrical storage device, which compensates a fluctuation in load until a rotating machine generator switches to an islanded operation after the supply of power from the commercial system is interrupted by the breaker by starting the supply of power when the breaker status signal is input.

3 Claims, 4 Drawing Sheets

ISLANDED POWER SYSTEM WITH DISTRIBUTED POWER SUPPLY

CROSS-REFERENCE TO RELATED APPLICATION

This application is a National Phase application of International Application No. PCT/JP2009/003806, filed Aug. 7, 2009, which is incorporated herein by reference in its entirety.

BACKGROUND

1. Field

The present invention relates to an islanded power system with a distributed power supply.

2. Description of the Related Art

In recent years, a "micro grid" for reducing the burden on a commercial system through a load following operation of a distributed power supply has been actively developed. In an energy supply system using a distributed power supply adopting the concept of the micro grid (hereinafter, simply referred to as a micro grid), there is a demand for a load following operation as follows. In a normal state, a connected operation is performed in which an electric generation amount is controlled so that the quantity of purchased power from the commercial system becomes stable. In an emergency state such as a blackout, an islanded operation is performed in which high-quality power (having a small fluctuation in voltage and frequency) is supplied into the micro grid system.

When the convenience of a building is taken into consideration, in an emergency state such as a blackout, it is desirable to construct a system that may switch to the islanded operation from the connected operation while maintaining high-quality power supply, without causing momentary interruption. Accordingly, the building may be continuously managed without a momentary stop inside the micro grid system, such as a computer comparatively sensitive to the quality (a fluctuation in voltage and frequency) of power, being influenced by an external blackout.

As the related art of switching to the islanded operation from the connected operation without causing momentary interruption, there is known an uninterruptible power supply switchable to an islanded operation disclosed in Patent Documents 1 and 2. This system will be briefly described by referring to FIG. 3. This system includes two types of power supplies, that is, a rotating machine generator 6 and a fuel cell 7. For the communication of measurement data measured by measurement equipment 31, 41, 51, 61, and 71 or a control signal output from a control unit 1, for example, a high-speed signal line such as an analog signal line is used.

Furthermore, in FIG. 3, the bold solid line indicates a power line, and the thin solid line indicates a signal line (high speed).

During the islanded operation, the rotating machine generator 6 is controlled in accordance with a constant voltage control, so that a fluctuation in voltage inside the micro grid system is suppressed. In the case of the constant voltage control of the rotating machine generator 6, the voltage of the islanded power system may fluctuate when there is a high frequency load fluctuation between the loads 3, 4, and 5. For this reason, in this system, the high frequency load fluctuation is compensated by using the fuel cell 7, and only a low frequency load fluctuation is compensated in the rotating machine generator 6, so that fluctuations in voltage of supplied power are suppressed. Further, when the islanded operation is selected, a detection signal of the system abnormality detection unit 9 detecting abnormality of the commercial system 2 is transmitted to the breaker 8 via a high-speed signal line, and a control signal is supplied to respective power supplies (the rotating machine generator 6 and the fuel cell 7) via a high-speed signal line using the control unit 1. Accordingly, since the breaker 8 is opened and the control for the islanded operation of each power supply is selected at once, a momentary interruption does not occur.

However, in the system configuration shown in FIG. 3, since all signals are transmitted and received via the high-speed signal line, a problem arises in that cost increases due to the work of burying the signal line. In order to solve such a problem, as a modified example of the system configuration of FIG. 3, for example, a system configuration may be considered in which an existing low-speed signal line such as a LAN line is used. As shown in FIG. 4, a signal line enabling a high-speed signal transmission is used as only the signal line S1 between the system abnormality detection unit 9 and the breaker 8, and a low-speed signal line is used as the other signal lines, whereby an increase in cost due to the work of burying the signal line may be suppressed.

Furthermore, in FIG. 4, the bold solid line indicates a power line, the thin chain line indicates a signal line (low speed), and the thin solid line indicates a signal line (high speed).

However, in the uninterruptible power generating system switchable to the islanded operation (FIG. 3) shown in Patent Documents 1 and 2, when the islanded operation is selected, the operation mode of the fuel cell is changed from the constant power control to the constant voltage control, and hence only the system voltage is maintained. For this reason, there is a problem in that it is difficult to maintain the frequency of the micro grid system in the islanded operation. Further, both the rotating machine generator and the fuel cell as the power supplies have a minimum power generation output due to the principle of power generation. For this reason, when the sum of the load inside the micro grid system in the islanded operation is equal to or less than the sum of the minimum output of the generators, there is a problem in that the supply of power is stopped.

Further, as in the system configuration shown in FIG. 4, when a LAN line is used as an existing low-speed signal line, there is a time delay of an order of several seconds for transmitting and receiving data. For this reason, there are problems in that the fuel cell may not compensate a high frequency load fluctuation of an order of several seconds or less during the islanded operation due to the time delay caused by the low-speed signal line and the quality of supplied power is degraded. Further, when the islanded operation is selected, the load compensated by the rotating machine generator changes in a step shape (at a very high speed) for the time delay caused by the low-speed signal line in accordance with the power flow of the breaker, thereby causing a problem in that the quality of power is degraded.

RELATED ART DOCUMENT

Patent Document

Patent Document 1: Japanese Unexamined Patent Application, First Publication No. 2002-135982

Patent Document 2: Japanese Unexamined Patent Application, First Publication No. 2002-171671

SUMMARY

Problem to be Solved by the Invention

The present invention is made in view of these circumstances, and an object of the present invention is to provide an islanded power system with a distributed power supply capable of maintaining supplied power quality without causing momentary interruption when switching to an islanded operation of a distributed power supply.

Means for Solving the Problem

According to an aspect of the present invention, there is provided an islanded power system with a distributed power supply including: a system abnormality detection unit which outputs an abnormality detection signal when an abnormality in a commercial system is detected; a breaker which interrupts a supply of power from the commercial system when the abnormality detection signal is input from the system abnormality detection unit; a status detection unit which outputs a breaker status signal when the breaker's open state is detected; and an electrical storage device which compensates a fluctuation in load until a rotating machine generator switches to an islanded operation after the supply of power from the commercial system is interrupted by the breaker by starting the supply of power when the breaker status signal is input.

In the islanded power system with the distributed power supply of the aspect, the status detection unit may transmit the breaker status signal via a high-speed signal line compared to other control system signals.

In the islanded power system with the distributed power supply of the aspect, when the breaker status signal is input from the status detection unit, the electrical storage device may measure an amount of supplied power thereof and perform an operation control so that a current control value is equal to a predetermined control value on the basis of the measurement amount of supplied power.

Effect of the Invention

According to the present invention, when the supply of power from the commercial system is interrupted, the supply of power is started by the electrical storage device capable of performing high-speed load following operation. Accordingly, a fluctuation in load may be compensated until the rotating machine generator switches to the islanded operation after the supply of power from the commercial system is interrupted. Therefore, there is an advantage in that supplied power quality may be maintained without causing momentary interruption when switching to an islanded operation of a distributed power supply.

DETAILED DESCRIPTION

Figure 1:
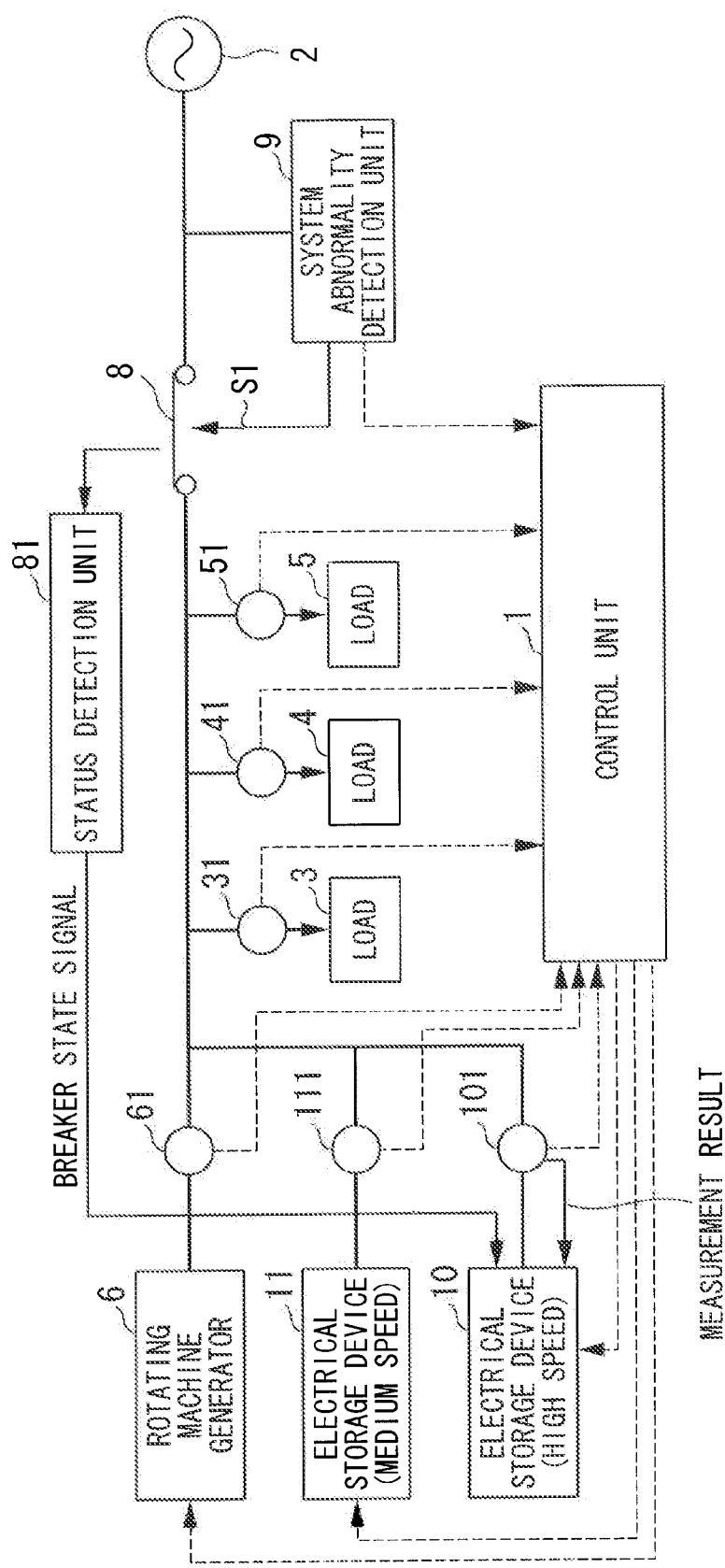
FIG. 1 is a block diagram illustrating a configuration of an embodiment of the present invention.
Figure 4:
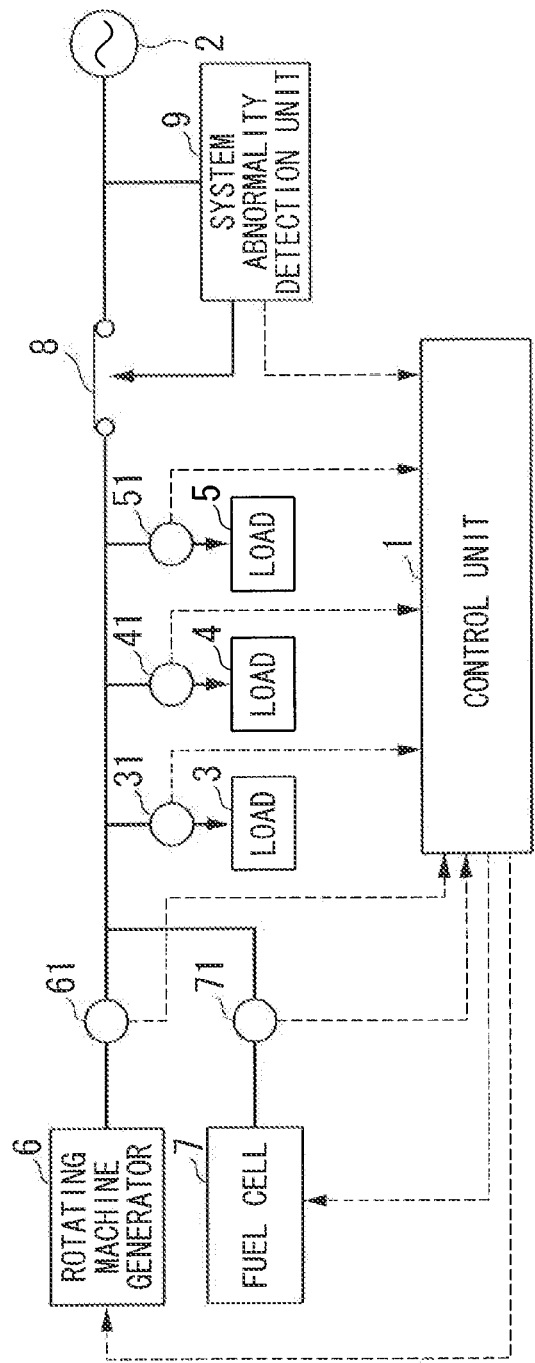
FIG. 4 is a block diagram illustrating a configuration of a system that is designed to improve the islanded power system shown in FIG. 3.

Hereinafter, an islanded power system with a distributed power supply according to an embodiment of the present invention will be described by referring to the drawings. FIG. 1 is a block diagram illustrating a configuration of the embodiment. In this drawing, the same reference numerals are given to the same components of the system shown in FIG. 4, and a description thereof is omitted. The islanded power system shown in this drawing is different from the system shown in FIG. 4 in that a fuel cell 7 is replaced with two types of electrical storage devices, that is, an electrical storage device (for example, an electric double layer capacitor) 10 performing the fastest load fluctuation compensation and an electrical storage device (for example, a nickel-hydrogen cell) 11 performing a control at the time interval of a several second order or more (medium speed), a status detection unit 81 is provided to detect the status of a breaker 8, and a control unit 1 is configured to control the operation of three power supplies (a rotating machine generator 6, the electrical storage device 10, and the electrical storage device 11).

Furthermore, in FIG. 1, the bold solid line indicates a power line, the thin chain line indicates a signal line (low speed), and the thin solid line indicates a signal line (high speed).

Next, an operation of the islanded power system shown in FIG. 1 will be described by referring to FIG. 1. First, a system abnormality detection unit 9 monitors power supplied from a commercial system 2, and transmits an abnormality detection signal to the breaker 8 and the control unit 1 when the abnormality of the commercial system is detected. At this time, a high-speed signal line is used as a signal line that transmits an abnormality detection signal S1 to the breaker 8. When the breaker 8 receives the abnormality detection signal S1, the breaker interrupts the commercial system (opens a switch). Further, when the control unit 1 receives the abnormality detection signal, the control unit switches to an islanded operation. In the islanded operation mode, the control unit 1 controls the operation of three power supplies (the rotating machine generator 6, the electrical storage device 10, and the electrical storage device 11) on the basis of load fluctuation measurement data of loads 3, 4, and 5 output from measurement equipment 31, 41, and 51, and supplied power measurement data of the rotating machine generator 6, the electrical storage device 10 and the electrical storage device 11 output from measurement equipment 61, 101, and 111. At this time, a low-speed signal line is used to transmit the measurement data and the operation control signal.

On the other hand, when the status detection unit 81 detects that the breaker 8 enters the interruption state (the switch opened state), the status detection unit 81 directly transmits a breaker status signal representing the interruption state to the electrical storage device 10 via the high-speed signal line (without using the control unit 1). Accordingly, the electrical storage device 10 starts a power supply operation control at the time of the islanded operation. In the islanded operation mode, the electrical storage device 10 receives a measurement result of the measurement equipment 101 representing measurement data of supplied power thereof via the high-speed signal line, and performs an own operation control (for the electrical storage device 10) so that a current control value is equal to a predetermined control value on the basis of the measurement data (hereinafter, this operation control is referred to as a local following control). Accordingly, a time delay caused by the low-speed signal line may be solved, and a high frequency load fluctuation may be compensated.

Likewise, the electrical storage device 10 rapidly switches to the control for the islanded operation by receiving the breaker status signal from the status detection unit 81 via the high-speed signal line. Accordingly, a high frequency load fluctuation may be compensated during a time until the rotating machine generator 6 or the electrical storage device 11 enters the control for the islanded operation mode (for a time delay caused by the low-speed signal line).

Furthermore, in order to prevent a time delay caused by the initial calculation time upon starting the islanded operation control in the electrical storage device 10, the control unit 1 may normally calculate a control value when the islanded operation mode is selected from a background of a connected operation, and transmit the control value to the electrical storage device 10 at a predetermined timing.

Further, in FIG. 1, a system configuration has been exemplified in which one unit of the electrical storage device 10 and one unit of the electrical storage device 11 are provided, but plural units of the electrical storage devices 10 and 11 may be provided. Further, a system configuration having only the electrical storage device 10 may be adopted by omitting the electrical storage device 11.

Figure 2:
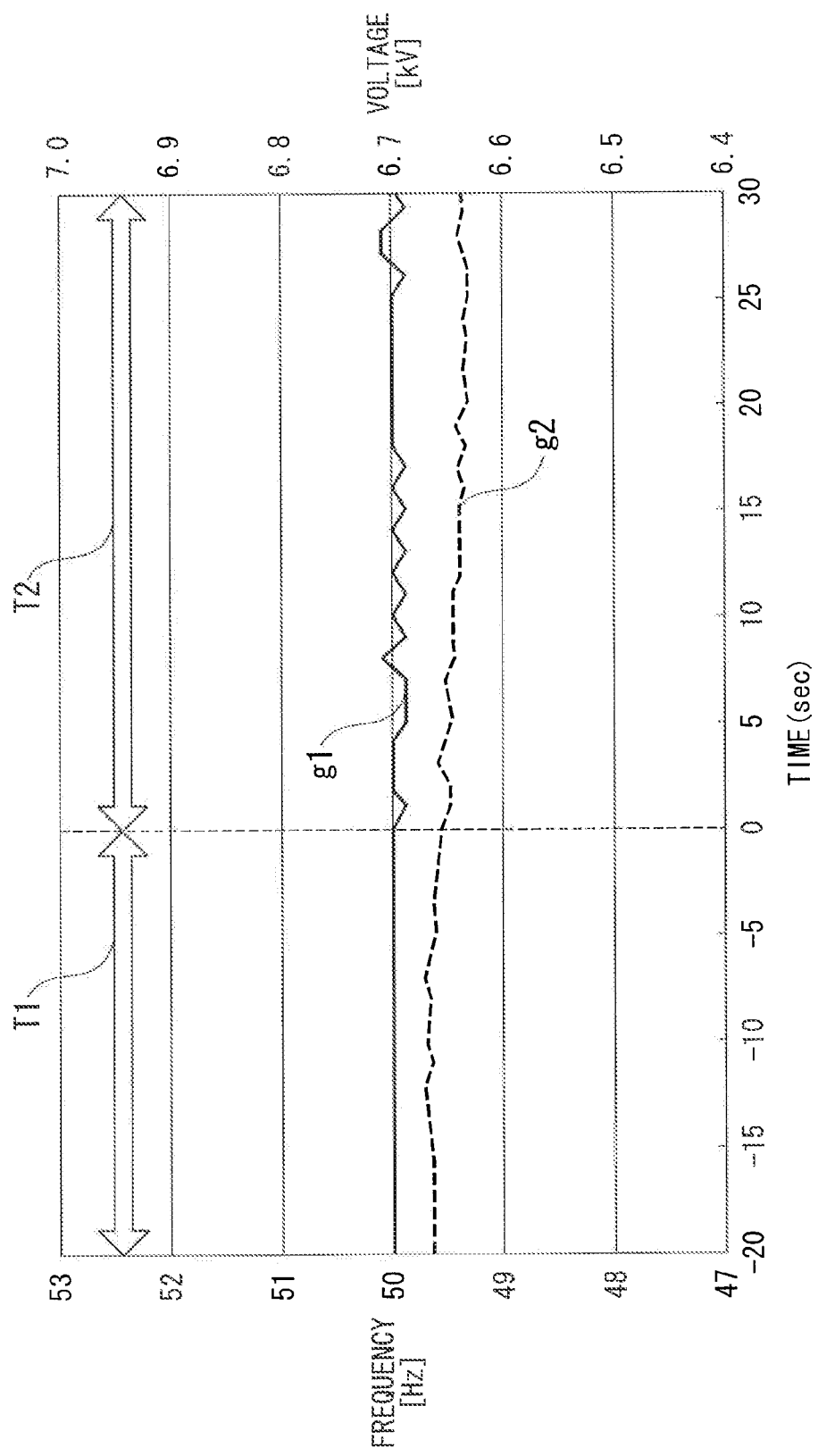
FIG. 2 is an explanatory diagram illustrating an example of power quality of an islanded power system according to the embodiment of the present invention.
Figure 3:
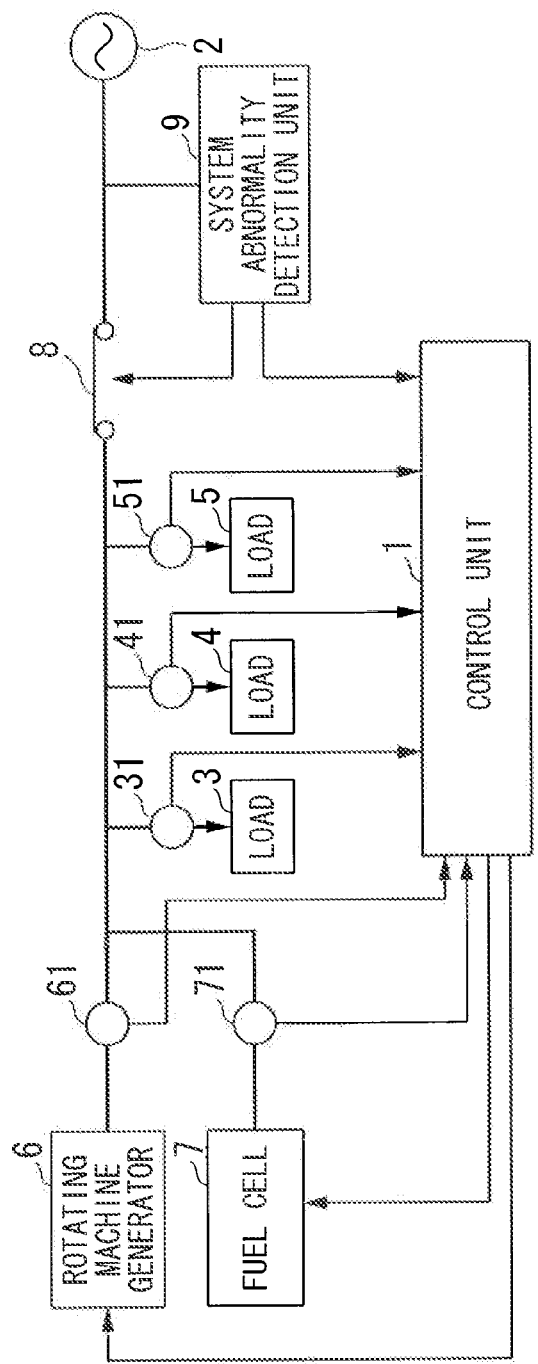
FIG. 3 is a block diagram illustrating a configuration of an islanded power system according to the related art.

Next, power quality when switching to the islanded operation mode according to the embodiment of the present invention will be described by referring to FIG. 2. In FIG. 2, the horizontal axis indicates a time (sec), the left vertical axis indicates a frequency [Hz], and the right vertical axis indicates a voltage [kV]. Further, in FIG. 2, the connected operation is performed for a time T1 (−20 to 0 (sec)), and the islanded operation is performed for a time T2 (0 to 30 (sec)). Further, in FIG. 2, a graph g1 indicates the waveform of a frequency, and a graph g2 indicates the waveform of a voltage.

FIG. 2 illustrates a measurement result for a one second period when entering the islanded operation mode on the condition that a gas engine of 350 kW is used as the rotating machine generator 6, a nickel-hydrogen cell of 400 kWh is used as the electrical storage device 11, and an electric double layer capacitor having a 100 kW×charge-discharge of 2 seconds is used as the electrical storage device 10. Here, the gas engine (the rotating machine generator 6) and the nickel-hydrogen cell (the electrical storage device 11) were controlled by the control unit 1 via a LAN line. The electric double layer capacitor (the electrical storage device 10) performed a local following control. In the islanded power system according to the embodiment of the present invention, a fluctuation in voltage of the islanded operation including the time immediately after the selection of the islanded operation is 1% or less with respect to 6.6 kV as a control target value of the measurement, and a fluctuation in frequency is ±0.1 Hz with respect to 50 Hz as a control target value. For this reason, a high-quality power supply may be realized.

As described above, since the rotating machine generator 6 is operated in accordance with a constant-voltage/constant-frequency control, the electrical storage devices 10 and 11 capable of maintaining the power quality (both the voltage and the frequency) inside a micro grid system and temporarily storing power by charging are used. For this reason, power supply may be maintained even when the sum of the load inside the micro grid system in the islanded operation mode is equal to or less than the minimum output of the rotating machine generator 6. By using the method of performing a control in the islanded operation and the method of controlling the switch to the islanded operation of the micro grid according to the embodiment of the present invention, high-quality power supply may be continuously performed including the time of switching to the islanded operation mode. As a result, equipment inside the micro grid may be prevented from being affected in the event of an abnormality such as breakout. Further, a signal line enabling high-speed communication is used as the signal line from the system abnormality detection unit 9 to the breaker 8, the signal line from the breaker 8 to the electrical storage device 10, and the signal line from the measurement equipment 101 to the electrical storage device 10, and a low-speed signal line such as a LAN line is used as other signal lines. For this reason, it is possible to prevent an increase in cost due to the work of burying the signal line.

INDUSTRIAL APPLICABILITY

The present invention may be applied to an islanded power system with a distributed power supply capable of maintaining supplied power quality without causing momentary interruption when switching to an islanded operation of a distributed power supply.

REFERENCE SYMBOLS

1: CONTROL UNIT
2: COMMERCIAL SYSTEM
3, 4, 5: LOAD
6: ROTATING MACHINE GENERATOR
8: BREAKER
81: STATUS DETECTION UNIT
9: SYSTEM ABNORMALITY DETECTION UNIT
10: ELECTRICAL STORAGE DEVICE (HIGH SPEED)
11: ELECTRICAL STORAGE DEVICE (MEDIUM SPEED)
31, 41, 51, 61, 101, 111: MEASUREMENT EQUIPMENT

What is claimed is:
1. An islanded power system with a distributed power supply, the islanded power system comprising:
    a rotating machine generator;
    a system abnormality detection unit configured to output an abnormality detection signal in case that an abnormality in a commercial system is detected;
    a breaker configured to interrupt a supply of power from the commercial system in case that the abnormality detection signal is input from the system abnormality detection unit;
    a status detection unit configured to output a breaker status signal in case that a breaker's open state is detected;
    an electrical storage device configured to compensate a fluctuation in load until the rotating machine generator switches to an islanded operation after the supply of power from the commercial system is interrupted by the breaker by starting the supply of power in case that the breaker status signal is input;
    a control unit configured to control at least one of the rotating machine generator and the electrical storage device, the control being performed by transmitting a control system signal;
    a first signal line configured to connect the control unit and the rotating machine generator, and connect the control unit and the electrical storage device; and
    a second signal line whose transmission speed is faster than that of the first signal line, the second signal line connecting the system abnormality detection unit and the breaker, the second signal line connecting the breaker and the status detection unit, the second signal line connecting the status detection unit and the electrical storage device without going through the control unit,
    wherein the control unit is configured to transmit, via the first signal line, the control system signal to at least one of the rotating machine generator and the electrical storage device,
    the system abnormality detection unit is configured to transmit, via the second signal line, the abnormality detection signal to the breaker, and the status detection unit is configured to transmit, via the second signal line and without going through the control unit, the breaker status signal to the electrical storage device.

2. The islanded power system with the distributed power supply according to claim 1, wherein the control unit is configured to make the islanded power system switch from a connected operation to the islanded operation in case of receiving the abnormality detection signal from the system abnormality detection unit, and the system abnormality detection unit is configured to output the abnormality detection signal to the control unit via the first signal line.

3. The islanded power system with the distributed power supply according to claim 2, wherein in case that the breaker status signal is input from the status detection unit, the electrical storage device is configured to measure an amount of supplied power thereof and perform an operation control so that a current control value is equal to a predetermined control value on the basis of the measured amount of the supplied power.

* * * * *